United States Patent Office 3,194,840
Patented July 13, 1965

3,194,840
N,N-DILOWERALKYL, 1,1-DIHYDROGEN PERFLUOROALKYL AMINE OXIDES
Jim S. Berry, Cincinnati, Ohio, assignor to The Procter & Gamble Company, Cincinnati, Ohio, a corporation of Ohio
No Drawing. Filed Dec. 18, 1961, Ser. No. 160,231
4 Claims. (Cl. 260—583)

This invention relates to a new class of functionally substituted fluorocarbons which are analogs of corresponding functionally substituted hydrocarbons in which substantially all of the hydrogens have been replaced with fluorine. More particularly, this invention relates to a new class of highly fluorinated-alkyl amine oxide compounds.

Florocarbons as a class of compounds were initially developed during the early 1940's. Since that time, research in the preparation of such compounds has proceed on a rahter limited basis. There are at present available commercially such fluorocompounds as the fluoroalcohols, fluorocarbon acids, and a few fluoroolefins such as tetrafluoroethylene.

It has now been discovered that certain new functionally substituted fluorocarbons may be produced mhich have exceptional and unexpected properties. Accordinly, it is an object of this invention to provide new compositions of matter. A further object is to provide a novel class of perfluorinated functionally substituted compounds. Another object is to provide a class of perfluorocarbon amine oxide compounds having surface active and detergent properties. A further object is to produce a new class of perfluorocarbon amine oxide compounds which have outstanding sudsing properties when employed in detergent compositions. Still another object of this invention is to provide a new class of perfluorocarbon amine oxide compounds which posses the property of rendering fabrics treated therewith to be highly lipid repellent. A further object is to provide a series of new compounds such as N,N-dimethyl-1,1-dihydrogen perfluorooctyl amine oxide, N,N-dimethyl-1,1-dihydrogen perfluorodecyl amine oxide and N,N-dimethyl-1,1-dihydrogen perfluoroundecyl amine oxide. Another object is to produce novel compositions containing the newly discovered class of perfluorocarbon amine oxide compounds.

The class of compounds covered by this invention conforms to the following general formula, $R_fCH_2N(O)R'R''$ structurally represented as

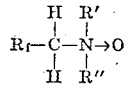

wherein $R_f$ can be from $C_3F_7$ to $C_{11}F_{23}$, and R' and R" each represent a lower alkyl radical.

The preferred embodiments of this invention are when $R_f$ represents a chain length greater than $C_5F_{11}$ and when R' and R" are each selected from the group of methyl, ethyl, and n-propyl.

The nitrogen-oxygen linkage represented by the arrow in the structural formula is variously called a coordinate-covalent bond, dative bond, or semipolar link and represents a single pair of electrons, both of which come from the nitrogen donor atom.

The compounds of this invention, in general, can be prepared by a multi-step process in which the starting material is a perfluoroalkyl carboxylic acid. The process generally conforms to the following broad outline.

Initially a perfluoroalkyl carboxylic acid is esterified by a lower alcohol in the presence of a small amount of a mineral acid catalyst. The resulting ester is then separated and dissolved in dry ether into which anhydrous ammonia is passed at ice bath temperatures, e.g., 0 to 5° C., until a strong ammonia odor is observable. After evaporation of ether and the ammonia, the product is recovered as an amide.

The next page involves dehydradtion of the amide to produce a nitrile by heating the amide derivative in the presence of a dehydrating agent. Thereafter, the nitrile is reduced by the introduction of hydrogen at moderately high pressure. After filtration and twofold distillation, the 1,1-dihydrogen-perfluoroalkyl amine is recovered.

Alkylation of the primary amine to a tertiary amine is then accomplished in any conventional manner. For example, methylation can be carried on by refluxing a mixture of the primary amine produced by the preceding step, a small amount of a concentrated mineral acid, formic acid, and formaldehyde. After a considerable reflux period, the mixture is neutralized by being poured into an excess of base solution, dried, and distilled. On analysis, the product is N,N-dimethyl-1,1-dihydrogen-perfluoroalkyl amine.

By the next step, this compound is oxidized by allowing the tertiary amine to react with 30% hydrogen peroxide and glacial acetic acid and heating to about 75 to 80° C. with occasional stirring for about 2 hours. The mixture is evaporated, solvent is removed, and the semisolid residue is dried in vacuo for about 24 hours. The sample is pulverized, triturated with dry ether, and filtered to give the N,N-dimethyl-1,1-dihydrogen perfluoroalkyl amine oxide.

Perfluoroalkyl carboxylic acids from which members of this new group of compounds may be produced and methods for their preparation are disclosed by Simons in his treatise, "Fiorine Chemistry," volumes I–IV, Academic Press, New York, 1950. Such methods are usually referred to as the electrochemical methods of fluorination and, very briefly, comprise dissolving organic substances such as carboxylix acids in anhydrous hydrogen fluoride to give conducting solutions. Direct electric current at a low voltage is passed through such a solution, or through a suspension of an insoluble organic compound in hydrogen fluoride made conducting by the addition of an electrolyte, causing hydrogen to be evolved at the cathode and the organic material to be fluorinated.

In order to illustrate a preferred method for preparing the compounds of the invention, but without being limited thereto, the following example is given.

EXAMPLE.—N,N-DIMETHYL - 1,1 - DIHYDROGENPERFLUOROOCTYLAMINE OXIDE 75 grams of perfluorooctanoic acid, $C_7F_{15}COOH$, was added to 22 grams of concentrated sulfuric acid and 12 grams of methanol. The mixture was stirred for approximately 2 hours at about 100° C. There was thus produced an ester, methyl perfluorooctanoate, $C_7F_{15}CO_2CH_3$. This was purified by water washing, drying, and distilling, and had a boiling point of about 158° C., and was obtained in a yield of 79%.

30 grams of the methyl perfluorooctanoate was dissolved in about 100 ml. of dry ethyl ether. The mixture was stirred while anhydrous ammonia was passed in at ice bath temperatures (0-5° C.) until a strong ammonia odor was observed. The ether and the ammonia are evaporated, and the dry amide product so produced was purified by being dissolved in a 50% benzene-50% acetone solution and recrystallized, yielding 81% of perfluorooctanamide having a melting point of 143-144° C.

38 grams of the perfluorooctanamide and 62.5 grams of phosphorous pentoxide were then heated together in a distilling flask at a temperature of about 200-210° C. until no further distillate was obtained. The product so formed was perfluoroheptylcyanide, $C_7F_{15}CN$, at yields of 82%. This nitrile derivative had a boiling point of 102° C. at atmospheric pressure.

A mixture of 29.6 grams of previously formed perfluoroheptylcyanide, 400 milligrams of an Adams platinum catalyst, and 75 ml. of absolute ether were placed in an autoclave into which hydrogen was introduced until a pressure of 1500 p.s.i. was reached. Reduction by the hydrogen was continued for about 2 hours at temperatures of about 55° C. to about 60° C. This was followed by filtration and two distillations of the autoclave contents producing 80% of a primary amine which was 1,1-dihydrogen-perfluorooctyl amine, $C_7F_{15}CH_2NH_2$, and which had a boiling point of about 149-150° C.

The primary amine was converted to a tertiary amine by methylating in the following manner. A homogeneous single phase aqueous solution was formed by mixing 24.8 grams of 1,1-dihydrogen perfluorooctylamine and 6.3 ml. of concentrated hydrochloric acid and this mixture was combined with 39.9 grams of 90% formic acid and 36.4 grams of 35% formaldehyde solution. The mixture was refluxed for approximately 19 hours and then poured into excess 25% sodium hydroxide solution to neutralize the mixture. The amine product was extracted from the mixture with ethyl ether and the aqueous layer was discarded. The ether layer was washed with water, dried over sodium hydroxide, and then distilled. The resulting product was N,N-dimethyl-1,1-dihydrogen-perfluorooctylamine, $C_7F_{15}CH_2N(CH_3)_2$, boiling at 161° C., having a refractive index, $n_D^{25}$, of 1.3134 and $d_4^{25}$ of 1.542, and was produced in a yield of 83%.

The tertiary amine was thereafter oxidized to the amine oxide by combining 15.0 grams of N,N-dimethyl-1,1-dihydrogen-perfluorooctylamine, 15 ml. of 30% aqueous hydrogen peroxide, and 15 ml. of glacial acetic acid and heating at 75-80° C. with stirring for about 2 hours. After removal of solvent in vacuo, the semisolid residue was dried in a vacuum dessicator overnight over soda-lime and calcium chloride. The product was pulverized, triturated with dry ethyl ether, and filtered. The result was N,N-dimethyl-1,1-dihydrogen-perfluorooctylamine oxide, $C_7F_{15}CH_2N(O)(CH_3)_2$, having a melting point of about 105° C.

It has been discovered that the functionally substituted fluorocarbons produced in accordance with this invention, including the amine oxide of the above example, possess marked surface active and detergent properties, and these are described in some detail below.

Detergency

As a generalization it was discovered that functionally substituted fluorocarbons as a class of compounds act poorly in detergency. The only notable exceptions are the perfluorocarbon amine oxides produced by this invention, which gave rather surprisingly good results in heavy-duty detergency evaluations. This was completely unexpected in view of the relatively short fluorocarbon chain lengths of the new compounds as compared to the well known $C_{12}$ to $C_{18}$ hydrocarbon chains in compounds having known detergency properties.

The test methods employed the well-known Terg-O-Tometer machine which is described in the literature, for example, in Detergency Evaluation and Testing, by J. C. Harris, published by Interscience Publishers, Inc., 1954. Sample washing formulations were prepared containing 20% of the detergent compound being tested, 50% of sodium tripolyphosphate, and 30% of sodium sulfate. Carefully prepared soiled swatches, each containing equal amounts of a standard soil, were then washed in the prepared sample solutions and cleaning results determined by measuring the light reflectance of the washed swatches as well as measuring the residual soil after a washing treatment. These tests showed the heavy-duty detergency of the perfluorocarbon amine oxide compounds to be comparable to sodium alkyl benzene sulfonate wherein the alkyl radical is a propylene tetramer.

Sudsing

The perfluorocarbon amine oxides of this invention were discovered to be clearly outstanding in sudsing properties and uniquely excellent in their capacity to produce suds even in the presence of heavy soil loads. Moreover, tests showed that the perfluorocarbon amine oxides, e.g., N,N-dimethyl-1,1-dihydrogen perfluorooctylamine oxide of the example, can also function as excellent suds builders for relatively low sudsing compounds such as $C_9$-$C_{18}$ alkyl benzene sulfonates.

Sudsing performance of detergent surfactant compounds can be very important. For example, in a product designed for dishwashing and heavy-duty laundry detergency, good initial sudsing and suds which last a long time are important, because the housewife and other users generally have come to associate sudsing with cleansing action and to consider the presence of suds as an indicator of the presence of active detergent.

The test used to measure the sudsing propensity of the compounds of this invention and detergent compounds with which they are compared may be characterized as a suds plunger test which simulates a conventional washing situation. The test consisted principally of preparing an aqueous solution containing a standardized soil load and placing the solution into a metal cylinder. A measured amount of a detergent formulation containing the compound to be tested for sudsing capacity was added to the solution in the cylinder and the solution was then vigorously agitated for a standardized period of time by means of a vertically actuated plunger. The suds height measured in millimeters was read and recorded. The stability of the suds produced was determined by allowing the column of suds to remain undisturbed for a few minutes and then taking a second reading. Any marked decrease in the height of the suds column would indicate that the suds produced would not be of an enduring nature.

The foregoing described test provides a dependable method for determining the relative sudsing capacity of various compounds as well as the stability of the suds produced. The data set forth below in Table I were obtained pursuant to the above test, and it establishes the perfluorocarbon amine oxides of this invention as outstanding sudsing materials. The specific test conditions were as follows. The temperature of the solution was 130° F., the concentration of the detergent formulation in the solution was 0.15% by weight, the pH was 10, and the water was of 7 grains per gallon hardness. The test formulation consisted of 17.5% organic detergent surfactant being tested for sudsing, 50% sodium tripolyphosphate, 23% sodium sulfate, 6% sodium silicate, and 3.5% water. It will be noted from Table I that the sudsing characteristics of the compounds of this invention are vastly superior to those of sodium alkyl benzene sulfonate as well as other perfluorocarbons tested. The alkyl benzene sulfonate employed in the test was the branched chain variety derived from polypropylene, the alkyl radical of which averages about 12 carbon atoms.

TABLE I.—INITIAL SUDSING CAPACITY
[Column height in millimeters]

| | Soil emulsion load in grams per liter | | | | | | |
|---|---|---|---|---|---|---|---|
| | 0.0 | 0.3 | 0.6 | 0.9 | 1.2 | 1.5 | 1.8 |
| Sodium perfluorooctanoate $C_7F_{15}CO_2Na$ | 4.0 | 2.0 | 0.0 | 0.0 | 0.0 | 0.0 | 0.0 |
| Sodium 1,1-dihydrogen perfluorooctyl sulfate ($C_7F_{15}CH_2OSO_3Na$) | 8.0 | 4.0 | 0.0 | 0.0 | 0.0 | 0.0 | 0.0 |
| Alkyl benzene sulfonate | 114.0 | 9.7 | 5.0 | 2.5 | 0.0 | 0.0 | 0.0 |
| N,N-dimethyl-1,1-dihydrogen perfluorooctyl amine oxide | 114.0 | 112.5 | 112.0 | 110.0 | 100.8 | 91.0 | 73.0 |

The above table indicates that both sodium perfluorooctanoate, $C_7F_{15}CO_2Na$, and sodium-1,1-dihydrogen-perfluorooctyl sulfate, $C_7F_{15}CH_2OSO_3Na$, were unable to produce any measurable suds in the presence of a soil load of between 0.3 gram and 0.6 gram per liter. The alkyl benzene sulfonate only produced a negligible amount of suds in the presence of a soil load of about 0.9 gram. At 1.2 grams, the alkyl benzene sulfonate produced no measurable suds. The perfluorocarbon amine oxide, however, maintained its exceptionally high capacity for suds production at soil loads as high as 1.8 grams per liter. This capacity to produce profuse amounts of suds even under relatively high soil loads renders the compounds suitable for applications wherein high soil loads might be encountered, as, for instance, dishwashing and heavy-duty detergency. Moreover, the suds produced by the amine oxide compound were exceptionally stable. A reading taken a short while after the initial suds height reading indicated that the suds columns produced by the perfluorinated amine oxides had not noticeably decreased in suds height, attesting to the stability of the suds produced. Each of the other column heights had substantially lower readings, indicating that the suds produced were less stable than those produced by the perfluorinated amine oxide compound.

As mentioned above, the compounds of this invention also function very well as suds builders for relatively poor sudsing detergent compounds. One such low sudsing compound is the alkyl benzene sulfonate employed in the preceding test. Suds builder capacity of the perfluorinated amine oxide compounds was observed from repeating the same test procedures used to measure sudsing capacity. First the suds heights were recorded for a formulation containing alkyl benzene sulfonate as the organic detergent surface active agent. Then the formulation was modified to include a small amount of a compound of this invention. The specific formulation used consisted of 17.5% sodium alkyl benzene sulfonate, 50% sodium tripolyphosphate, 23.0% sodium sulfate, 6.0% sodium silicate, and 3.5% of N,N-dimethyl-1,1-dihydrogen perfluorooctyl amine oxide as a suds builder. The results are produced in the following table.

TABLE II.—SUDS BUILDING CAPACITY
[Column height in millimeters]

| | Soil emulsion load in grams per liter | | | | | | |
|---|---|---|---|---|---|---|---|
| | 0.0 | 0.3 | 0.6 | 0.9 | 1.2 | 1.5 | 1.8 |
| Alkyl benzene sulfonate (alone) | 110.0 | 60.0 | 10.0 | 9.0 | 8.0 | 6.5 | 5.0 |
| Sodium alkyl benzene sulfonate built with N,N-dimethyl-1,1-dihydrogen perfluorooctyl amine oxide | 118.0 | 106.0 | 92.5 | 87.0 | 84.0 | 62.0 | 38.0 |

These data show the marked relative ability of the perfluorinated amine oxide substantially to build the sudsing capacity of alkyl benzene sulfonate solutions. In addition, the suds built with such amine oxides were found to be exceptionally stable.

Mildness tests

The fluorocarbon amine oxides, especially the N,N-dimethyl-1,1-dihydrogen perfluorooctylamine oxide of the example, are extremely mild to the skin. Moreover, they function as effective mildness additives for other organic detergent surfactant materials which may be less mild. An example of such an organic material is the same alkyl benzene sulfonate employed in each of the preceding evaluations.

The exceptional mildness of the compounds of this invention was determined by conducting guinea pig immersion tests. In these tests groups of three guinea pigs which had their abdomens shaved were immersed up to the thorax in an aqueous solution of the detergent surfactant compounds being tested. The bath was maintained at a constant temperature of about 37° C., and the immersion periods were for 4½ hours at the same period of time on each of three consecutive days. The readings were made about 72 hours after the conclusion of the third exposure.

TABLE III.—GUINEA PIG IMMERSION TEST

| Surfactant | Aqueous surfactant solution concentration by weight | Average skin grade |
|---|---|---|
| N,N-dimethyl-1,1-dihydrogen perfluorooctylamine oxide | .2% | 9, 10, 10 |
| Alkyl benzene sulfonate | .2% | 5, 5, 5 |
| Mixture of one part of N,N-dimethyl-1,1-dihydrogen perfluorooctylamine oxide and two parts alkyl benzene sulfonate | .3% | 9, 9, 10 |

The skin grade values assigned are based on a range of 1 to 10 within which values of 1 and 2 represent severe degrees of skin irritation. A value of 1 represents the most extreme irritation of the skin. With guinea pigs a value of 1 indicates bleeding and skin fissures, while a value of 1 in exaggerated tests on human subjects indicates severe redness and dryness of the skin. Thus the exaggerated exposure tests on animals are much more extreme than comparable tests conducted on human subjects. Intermediate values going from 4 to 8 represent increasing mildness. Values of 9 and 10, such as those achieved by the N,N-dimethyl-1,1-dihydrogen perfluorooctylamine oxide and a 1:2 mixture respectively of N,N-dimethyl-1,1-dihydrogen perfluorooctylamine oxide and the alkyl benzene sulfonate, represent the ultimate in mildness.

Effect on fabrics

A very important and valuable property of the perfluorocarbon amine oxides of this invention is the ability of these materials to produce surfaces on fabrics which are highly repellent to lipids. This property was discovered by conducting the following test. Muslin swatches were dipped into a $2.4 \times 10^{-3}$ M aqueous solution of the compound to be tested, the excess was shaken off, and then the muslin swatch was air dried. Thereafter, an assorted number of lipids were separately added dropwise onto the treated swatches and the length of time it took for the droplet to penetrate the swatch was noted. While other factors such as surface roughness of the fabric, viscosity, and surface tension of the lipid may have a bearing on the penetration or wetting time, the tests are highly dependable for determining the relative value of lipid repellency of a treated swatch. The test results tabulated below in Table IV are classified into categories such as "immediate penetration," "slow penetration," etc.

the perfluorocarboxylic acid will determine the perfluorocarbon chain length, it may be varied at will depending on the product desired. The specific reaction conditions such as temperatures, pressures, etc., may have to be adjusted to accommodate different starting materials, but these variations in the exemplified method will be readily apparent to persons skilled in the art.

In those instances where the N,N-dialkyl radicals are to be mixed alkyls such as N-ethyl, N-n propyl, etc., the tertiary amine may be formed by introduction of the alkyl groups to the 1,1-dihydrogen-perfluoroalkyl amine by the well known Hofmann procedure, for example. This procedure is described, for instance, in N. V. Sidgwick's "Organic Chemistry of Nitrogen," Oxford University Press, 1937, pp. 13–14.

The sudsing, mildness, and detergency properties as

TABLE IV.—RATE OF WETTING [1]

| Muslin swatch sample containing about 1% by wt. level of following agent | Cottonseed oil | Nujol (liquid petroleum) | Methyl palmitate | Methyl undecyl ketone | Dimethyl dodecyl amine | Dodecyl amine | Dibutyl amine | Lauryl alcohol |
|---|---|---|---|---|---|---|---|---|
| 1. Untreated | Imm | Imm | Imm | Imm | Imm | Imm | Imm | Imm. |
| 2. N,N-dimethyl-1,1-dihydrogen perfluorooctyl amine oxide | Nonwetting | Nonwetting | Nonwetting | Slow | Slow | Slow | Slow | Slow. |
| 3. Tetrapropylene benzene sulfonate | Fast | Fast | Imm | Imm | Imm | Imm | Imm | Imm. |
| 4. Straight chain dodecyl benzene sulfonate | do | do | Imm | Imm | Imm | Imm | Imm | Imm. |

[1] Imm.=few seconds; fast=up to 2 min.; slow=2–15 min.; non-wetting=more than 1 hour.

From the above table the lipid repellency of N,N-dimethyl-1,1-dihydrogen perfluorooctyl amine oxide may be seen to be very good. The exact explanation of this phenomenon is not completely understood, although the improved results are readily apparent.

Similar tests at measured levels also established that the minimum level of the perfluorooctyl amine oxide required to give a desirable lipid repellency was about 0.1% by weight of the swatches.

It was also discovered that the compounds of this invention were capable of imparting to fabrics a marked softening effect. This was very surprising because heretofore this phenomenon has been associated generally with cationic surface active agents having about 18 carbon atoms in the hydrophobic chain. The test used to reveal this softening effect comprised uniformly wetting a terry cloth swatch with a solution containing a measured concentration of the compound being tested and allowing the swatch to dry. The N,N-dimethyl-1,1-dihydrogen perfluorooctylamine oxide gave detectable softening of terry cloth swatches at levels as low as 0.05% of the fabric weight.

Examples of other perfluorocarbon amine oxides which are contemplated as being produced according to this invention and thus within the scope thereof include (1) N,N-diethyl-1,1-dihydrogen perfluorobutyl amine oxide.
(2) N,N-di-n-propyl-1,1-dihydrogen perfluoroamyl amine oxide.
(3) N-methyl-N-ethyl-1,1-dihydrogen perfluorohexyl amine oxide.
(4) N-methyl, N-n-propyl-1,1-dihydrogen perfluoroheptyl amine oxide.
(5) N-ethyl, N-n-propyl-1,1-dihydrogen perfluorononyl amine oxide.
(6) N,N-dimethyl-1,1-dihydrogen perfluorodecyl amine oxide.
(7) N,N-dimethyl-1,1-dihydrogen perfluoroundecyl amine oxide.

These novel perfluorinated amine oxide compounds can also be produced essentially by the exemplified method herein. Obvious variations can be made in the process, such as, for example, the substitution of various perfluorocarboxylic acid starting materials. Since the selection of well as the effects on fabrics caused by these additional compounds are comparable to those described above for N,N-dimethyl-1,1-dihydrogen perfluorooctylamine oxide and can generally be substituted freely in place thereof.

Compounds of this invention are useful per se as detergents and surface active agents. Desirably they are used with other materials to form detergent compositions, particularly solid compositions as, for example, bar, flake or granular compositions. Such detergent compositions can contain from about 5% to about 80% of the perfluorocarbon amine oxides of this invention and from about 20% to about 95% of anionic organic detergents, nonionic detergents, water-soluble inorganic alkaline builder salts, water-soluble organic alkaline sequestrant builder salts, or mixtures thereof. Granular or flake detergents preferably contain about 5% to about 50% of the perfluorocarbon amine oxides of this invention.

Anionic organic detergents used alone or in admixture in combination with the compounds of this invention include both the soap and the non-soap detergents. Examples of suitable soaps are the sodium, potassium, ammonium, and alkylolammonium salts of higher fatty acids ($C_{10}$–$C_{20}$). Particularly useful are the sodium and potassium salts of the mixtures of fatty acids derived from coconut oil and tallow, i.e., sodium or potassium tallow and coconut soap. Examples of anionic organic non-soap detergents are: alkyl glyceryl ether sulfonates; alkyl sulfates; alkyl monoglyceride sulfates or sulfonates; alkyl polyethenoxy ether sulfates; acyl sarcosinates; acyl esters of isethionates; alkyl phenol polyethenoxy sulfonates. In these compounds the alkyl and acyl groups, respectively, contain 10 to 20 carbon atoms. They are used in the form of water-soluble salts, the sodium, potassium, ammonium and alkylolammonium salts, for example. Specific examples are: sodium lauryl sulfate; potassium N-methyl lauroyl tauride; triethanolamine dodecyl benzene sulfonate.

The examples of nonionic organic detergents are: polyethylene oxide condensates of alkyl phenols wherein the alkyl group contains from 6 to 12 carbon atoms (e.g., octylphenol) and the ethylene oxide is present in a molar ratio of ethylene oxide to alkyl phenol in the range of 10:1 to 25:1; condensation products of ethylene oxide with the product resulting from the reaction of propylene oxide and ethylene diamine wherein the molecular weight of the condensation products ranges from 5,000 to 11,000; the condensation products of from about 5 to 30 moles of ethylene oxide with one mole of a straight or branched chain aliphatic alcohol containing from 8 to 18 carbon atoms (e.g., lauryl alcohol).

Water-soluble inorganic alkaline builder salts used alone or in admixture are alkali metal carbonates, borates, phosphates, polyphosphates, bicarbonates and silicates. Specific examples of such salts are sodium tripolyphosphate, sodium carbonate, sodium tetraborate, sodium pyrophosphate, sodium bicarbonate, potassium tripolyphosphate, sodium hexametaphosphate, sodium sesquicarbonate, mono- and disodium orthophosphate, and potassium bicarbonate. Such inorganic builder salts enhance the detergency of the subject perfluorocarbon amine oxides.

Examples of water-soluble organic alkaline sequestrant builder salts used alone or in admixture are alkali metal amino polycarboxylates; e.g., sodium and potassium ethylene diamine tetraacetate, sodium and potassium N-(2-hydroxyethyl)-ethylene diamine triacetates, sodium and potassium nitrilo triacetates and sodium and potassium N-(2-hydroxyethyl)-nitrilo diacetates. Mixed salts of these polycarboxylates are also suitable. The alkali metal salts of phytic acid, e.g., sodium phytate, are also suitable as organic alkaline sequestrant builder salts (see U.S. Patent 2,739,942).

Preferred detergent compositions contain about 7% to about 50% of the perfluorocarbon amine oxides of this invention and about an 8%–75% amount of sodium tripolyphosphate. Particularly preferred amine oxides are N,N-dimethyl-1,1-dihydrogen perfluorooctylamine oxide, N,N-dimethyl-1,1-dihydrogen perfluorononyl amine oxide and N,N-dimethy-1,1-dihydrogen perfluorodecyl amine oxide, all of which have valuable sudsing and lipid repellent characteristics.

When the perfluorocarbon amine oxides of this invention are employed as suds builders for low-sudsing detergent compounds, they may be present in the weight ratio of amine oxide to low-sudsing detergent compound of about 1:1 to about 1:6. A more preferred ratio is 1:2 to about 1:5. The data presented in Table II, for example, were reported from tests using a ratio of amine oxide to sodium alkyl benzene sulfonate of 1:5.

Generally, any low-sudsing organic detergent compound may be built by the perfluorocarbon amine oxides of this invention.

The detergent compositions of this invention may contain any of the usually employed adjuvants, diluents, and additives without adversely affecting the basic properties of the new compositions. For example, ampholytic detergents, cationic detergents, perfumes, antitarnishing agents, antiredeposition agents, bacteriostatic agents, dyes, pigments, fluorescers, and the like are contemplated.

As many apparently widely different embodiments of this invention may be made without departing from the spirit and scope thereof, it is to be understood that the invention is not limited to the specific embodiments thereof except as defined by the appended claims.

I claim:
1. The class of compounds having the following formula

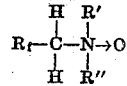

wherein $R_f$ represents a perfluorinated straight chain alkyl radical ranging from $C_3F_7$ to $C_{11}F_{23}$ and $R'$ and $R''$ represent lower alkyl radicals wherein each of which is selected from the group consisting of methyl, ethyl, and n-propyl.

2. N,N-dimethyl-1,1-dihydrogen perfluorooctyl amine oxide.

3. N,N-dimethyl-1,1-dihydrogen perfluorodecyl amine oxide.

4. N,N-dimethyl-1,1-dihydrogen perfluoroundecyl amine oxide.

References Cited by the Examiner

UNITED STATES PATENTS

| | | | |
|---|---|---|---|
| 2,060,568 | 11/36 | Graenacher et al. | 260—583 |
| 2,769,824 | 11/56 | Schneider et al. | 260—583 |
| 2,983,684 | 3/61 | Langdon | 252—117 |
| 3,043,779 | 7/62 | Parke et al. | 252—117 |
| 3,047,579 | 7/62 | Witman | 260—583 |

FOREIGN PATENTS

| | | |
|---|---|---|
| 758,156 | 10/56 | Great Britain. |
| 761,001 | 11/56 | Great Britain. |

CHARLES B. PARKER, *Primary Examiner.*

J. GREENWALD, *Examiner.*